United States Patent [19]
Singleton

[11] Patent Number: 5,843,306
[45] Date of Patent: Dec. 1, 1998

[54] TEMPORARY SILT GUARD FOR STORM WATER COLLECTION BASIN INLET

[76] Inventor: Earl R. Singleton, 1060 Ellington Rd., Oxford, Ga. 30267

[21] Appl. No.: 834,446

[22] Filed: Apr. 16, 1997

[51] Int. Cl.[6] .................................................. B01D 35/02
[52] U.S. Cl. ......................... 210/163; 210/166; 210/170; 210/460; 405/41
[58] Field of Search ..................................... 210/162, 163, 210/166, 170, 232, 460; 405/41, 48

[56] References Cited

U.S. PATENT DOCUMENTS

| | | | |
|---|---|---|---|
| 770,019 | 9/1904 | Neireiter ..................................... | 405/41 |
| 1,310,055 | 7/1919 | Caldwell . | |
| 1,791,512 | 2/1931 | Schurman . | |
| 3,517,813 | 6/1970 | Thaler ..................................... | 210/166 |
| 3,713,539 | 1/1973 | Thompson et al. ..................... | 210/164 |
| 3,804,258 | 4/1974 | Okuniewski et al. .................. | 210/460 |
| 4,419,232 | 12/1983 | Arntyr et al. ........................... | 210/164 |
| 4,460,462 | 7/1984 | Arneson .................................. | 210/163 |
| 4,525,273 | 6/1985 | Logsdon ................................. | 210/164 |
| 4,658,449 | 4/1987 | Martin ......................................... | 4/496 |
| 4,935,132 | 6/1990 | Schaier ................................... | 210/163 |
| 5,089,108 | 2/1992 | Small ...................................... | 210/460 |
| 5,284,580 | 2/1994 | Shyh ....................................... | 210/163 |
| 5,297,895 | 3/1994 | Johnson .................................... | 405/41 |
| 5,403,474 | 4/1995 | Emery .................................... | 210/163 |
| 5,469,670 | 11/1995 | Thaler .................................... | 210/460 |
| 5,480,254 | 1/1996 | Autry et al. ................................ | 404/2 |
| 5,486,287 | 1/1996 | Murphy et al. ........................ | 210/164 |
| 5,511,903 | 4/1996 | Nichols et al. ........................... | 405/43 |
| 5,526,613 | 6/1996 | Simeone, Jr. ........................... | 210/163 |
| 5,650,065 | 7/1997 | Sewell .................................... | 210/163 |

*Primary Examiner*—Jay H. Woo
*Assistant Examiner*—Betsey J. Morrison
*Attorney, Agent, or Firm*—Isaf, Vaughan & Kerr

[57] ABSTRACT

A temporary silt guard for temporarily enclosing the open upper end of a drop inlet during the construction of a road system in commercial and residential developments is adapted to fit over and seat upon the open end of the drop inlet to enable storm runoff water to drain into the drop inlet while preventing silt and debris from being carried into and collected therein. The silt guard includes a body having a filter box portion formed from a series of radially spaced slats. A silt screen material is encircled about at least the slats of the filter box portion and secured to the body portion, with the slats providing rigidity and strength to the silt screen material. The silt screen material filters out silt and debris while enabling storm water and runoff to drain into the drop inlet.

17 Claims, 3 Drawing Sheets

TEMPORARY SILT GUARD FOR STORM WATER COLLECTION BASIN INLET

FIELD OF THE INVENTION

The present invention relates in general to devices for preventing silt and debris from collecting in storm water drainage pipes at construction sites, and in particular to a device that fits over and encloses the open end of a storm water collection basin inlet so as to trap and prevent silt and other debris from being washed into or being otherwise deposited within the inlet and thus the drainage pipes, while still enabling water to drain into the collection basin.

BACKGROUND OF THE INVENTION

In the construction of new housing and other types of developments, the road system generally is first marked out and the streets into and through the development are cut and graded. Thereafter, the storm water drainage system for the development is constructed, which typically includes the underground drainage pipes, collection basins and culverts, and drop inlets that form the manholes or drain openings along the street. The culverts are installed after the street bed has been graded to the elevation, whereupon the drop inlets are then installed and connected to pipes and to the collection basins. The drop inlets generally are substantially cylindrical concrete pipes that are installed vertically, with their lower ends connecting to the collection basins and drainage pipes, and their upper ends being substantially at street level.

Once the grading of the street bed has been completed and the drainage system substantially installed, the drainage system then will be buried and the curbs for the street are graded and poured. Thereafter, throats are provided for the manholes, the throats being poured about the open ends of the drop inlets to form the curb inlets or drains and manholes along the sides of the streets through which storm water drains.

During the construction of roads and drainage systems, until the street has been substantially completed and the curbs and throats of the drainage system have been poured, the collection basins must be kept substantially free of dirt and debris pursuant to state and county building codes. Keeping dirt and debris out of the collection basins is, however, very difficult to accomplish as once the curbs are graded and the roads completed, during grading of the curbs as well as additional grading on site, dirt and debris is pushed to the sides of the street by the motor grader or bulldozer, and thus may pass into the open upper ends of the drop inlets. In addition, rain, runoff and wind also tend to wash or blow dirt and debris into the open ends of the drop inlets, which then collects in the collection basins.

If dirt and debris are washed into or otherwise collected within the collection basins and/or other parts of the drainage system, it becomes necessary to send laborers down into the drop inlets and collection boxes to manually clean out the dirt and/or debris that has been washed or accidentally dropped into the collection basins to comply with building code regulations. Such cleaning operations are difficult as the pipes are somewhat cramped, making it difficult to maneuver, and there is also the danger of cave-ins or collapse of the dirt, etc. that has built up around the sides of the collection basins, creating a significant risk of injury or even death to the laborers below. In addition, there can be as much as a ten to twelve-foot drop from the surface of the road, and the upper end of the drop inlet, to the bottom of the collection basin on which the drop inlet is mounted. A fall from such a height can cause severe injuries to persons who might inadvertently fall into the inlet, especially as the open end of the inlet becomes obscured by dirt and other debris. The danger of an exposed, i.e. open, ten to twelve-foot drop, inlet is especially great for children who might play around the area and are more likely to be curious and to inadvertently fall in and become trapped within the collection basins.

In the past, the open upper ends of the drop inlets generally have been protected with a simple silt fence constructed of a flexible mesh or screen material attached to a series of wooden stakes positioned about the open upper end of the drop inlet. Such an arrangement is illustrated in FIG. 1, which shows in general the known method of enclosing and marking the open end of a drop inlet at construction sites. Such an arrangement, however, has not proven satisfactory for preventing dirt and debris from falling into the open end of the drop inlet, and they provide little or no protection against persons inadvertently falling into an open drop inlet, and especially for keeping children out of the inlet.

In fact, as shown in FIG. 2, such silt fence arrangements typically tend to collapse, or be blown down, or washed down over a short period of time. This is due to the fact that the mesh of the silt fence and the stakes holding the silt fence in place are not strong enough to withstand heavy rains and wind, and even less so the force of dirt and debris being pushed against the silt fence by a motor grader or bulldozer as the streets and curbs of the site are graded. Under such weight, as illustrated in FIG. 2, the silt fence generally will collapse, often falling into the open end of the drop inlet itself thus permitting the accumulated dirt and debris being urged or pushed thereagainst to fall into the drop inlet.

Although the simplest solution to this problem would seem to be to completely seal the open end of the drop inlet, this is not feasible as rain and storm runoff water must be permitted to drain through the drainage system of the development during construction to permit the ground to dry, and to prevent storm water from eroding the work site and carrying soil and debris to adjacent lots or buildings. The construction site must be kept as dry as possible in order to enable the curbs and throats to be poured and the streets to be finished, which cannot otherwise be accomplished if the ground is too wet to support the concrete as it is poured and formed.

Accordingly, it can be seen that a need exists for a device to cover and protect the open upper end of a drop inlet for a storm water collection basin of a drainage system at new construction developments which will prevent silt, dirt and debris from being washed or blown into the inlet, and will also prevent access to the inlet to minimize the risk of accidents due to persons falling or climbing into the open inlet, but which still allows for the free and substantially complete drainage of storm runoff water at the development site.

SUMMARY OF THE INVENTION

Briefly described, the present invention comprises a temporary and substantially rigid silt guard and cover for a drop inlet used in drainage system. The present invention generally is designed for use at construction sites for enclosing the open upper end of a drop inlet of the drainage system of the development during the construction of the streets, curbs, and the construction of the drainage system itself. The silt guard generally is substantially cylindrically shaped, is approximately two to three feet in height, and is formed from a rigid, durable plastic material, and is sized and shaped to fit over and seat upon the upper ends of most conventional drop inlets.

The silt guard typically includes a substantially cylindrical body portion having a circular bottom rim. The bottom rim is approximately 48 to 50 inches in diameter, defining a lower opening in the silt guard, and is adapted to fit over and seat upon the open upper end of a drop inlet. The body portion further includes a filter box portion having a base and an upper portion in which a series of spaced, vertically extending slats or ribs are defined that taper inwardly toward the upper end of the body. The slats are generally spaced approximately 1 to 2 inches apart from one another to form a series of openings or passages therebetween to enable the flow of water into and through the silt guard while blocking passage of large debris to protect the mesh of the silt guard.

The silt guard further includes a top portion that extends upwardly from the body and generally has a substantially smaller diameter than the upper end of the body. The top portion includes a skirt that extends vertically and tapers toward an upper rim that defines an inlet opening of a reduced diameter to enable egress into and out of the drop inlet, as needed. A series of spaced slots are formed in the skirt to enable a pipe or bar to be inserted therethrough to aid in the removal of the silt guard from the upper end of the drop inlet, and to provide an extra pathway for runoff and storm water to drain into the collection basin on which the inlet is mounted.

A lid or cover also can be attached to the upper rim of the top portion of the silt guard, as desired. The lid is sized to fit over and enclose the inlet opening of the silt guard. A lock mechanism or latch generally is provided for locking or otherwise securing the lid in a closed position to prevent access to the drop inlet opening so as to minimize the risk of persons inadvertently falling into the drop inlet and being injured.

In use, workers wrap the filter box portion of the body with a silt screen or mesh material typically having a width of at least two feet. The silt screen material is secured to the upper end of the body portion by fasteners, such as screws inserted into a series of fastener holes formed about the upper end of the body, or on hooks or similar fastening devices mounted to the upper end of the body. The lower end of the silt screen material is left overlapping the bottom rim of the silt guard and thus overlapping the open upper end of the drop inlet on which the silt guard is mounted.

As dirt is urged against the inlet, the weight of the dirt helps hold the silt guard on the inlet and the silt screen material against the silt guard. The slats or ribs of the filter box portion of the body provide strength and rigidity to the silt screen material as dirt and debris are pushed thereagainst so as to prevent the collapse of the silt screen material, and thus the passage of the dirt and debris into the drop inlet. The silt screen material enables rain and runoff water to pass therethrough and through the openings or passages formed between the slats to enable rainwater, etc. to drain into the drainage system while blocking the passage of silt and debris therethrough.

Once the curbs have been graded and are being poured, workers will dig out the excess dirt from around the silt guard and drop inlet, if any has so accumulated, and the silt guard can be lifted upwardly and off of the drop inlet to enable the throat to be poured around the drop inlet to finish the drain or manhole. The used silt screen material then simply is peeled or otherwise stripped off of the silt guard, and the silt guard cleaned of excess dirt and debris leaving it ready for its next use.

Various objects, features and advantages of the present invention will become apparent to those skilled in the art upon reading the following detailed description, when taken in conjunction with the accompanying drawings.

DETAILED DESCRIPTION

Figure 1:
FIG. 1 is a perspective view of a known silt fence arrangement for enclosing an open drop inlet.
Figure 2:
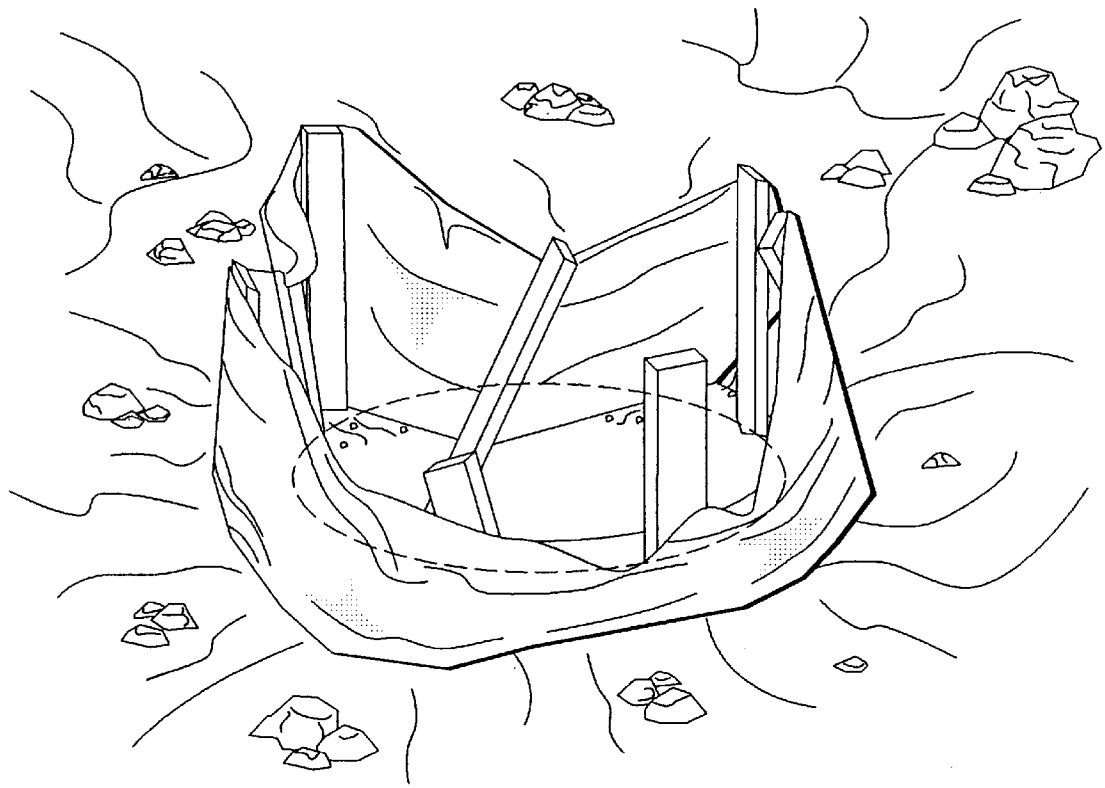
FIG. 2 is a perspective view of a known silt fence arrangement for enclosing an open drop inlet, illustrating the tendency of such an arrangement to collapse as dirt and debris collects thereagainst.
Figure 3:
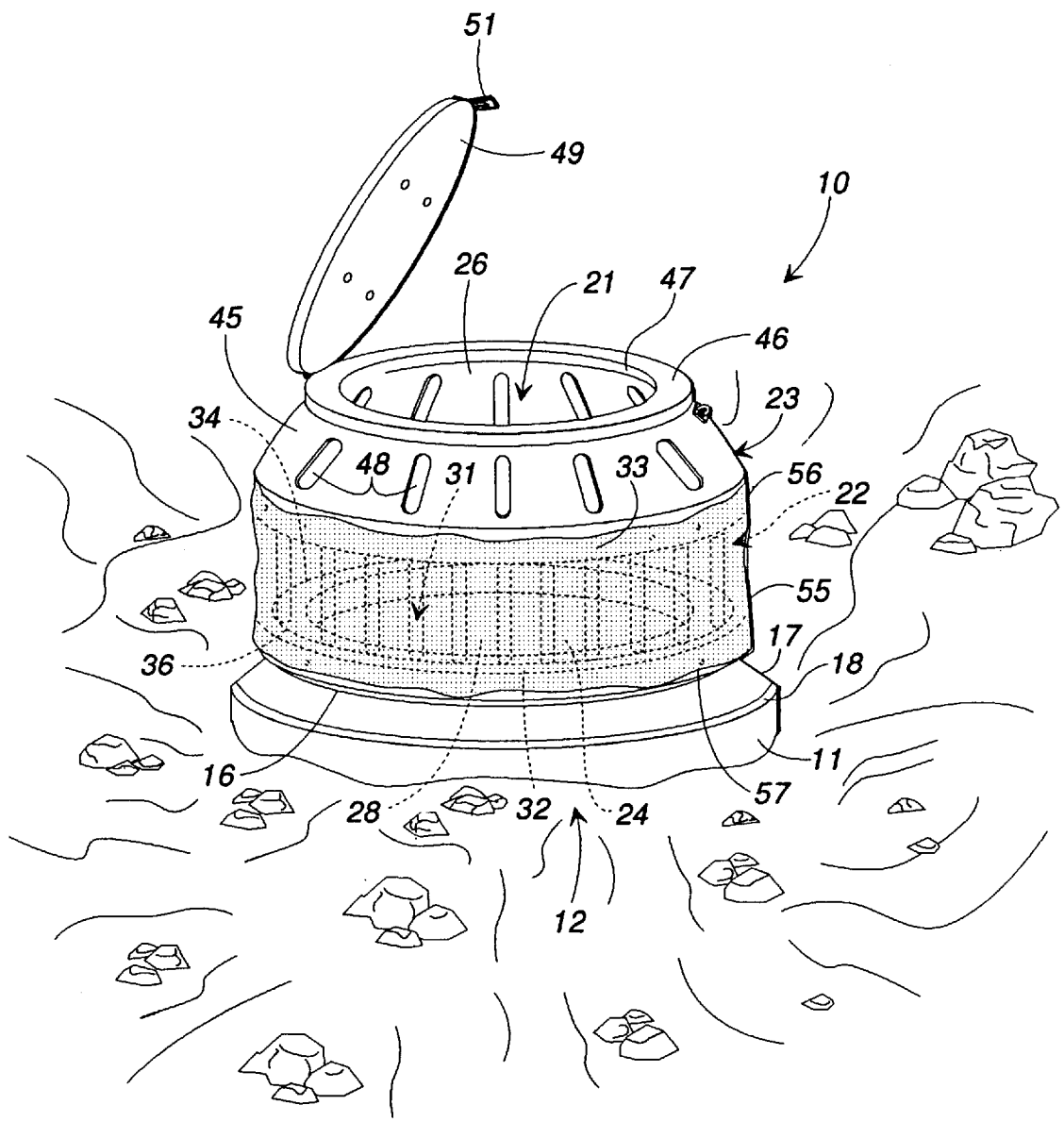
FIG. 3 is a perspective view of the silt guard of the present invention mounted on top of a drop inlet.
Figure 4:
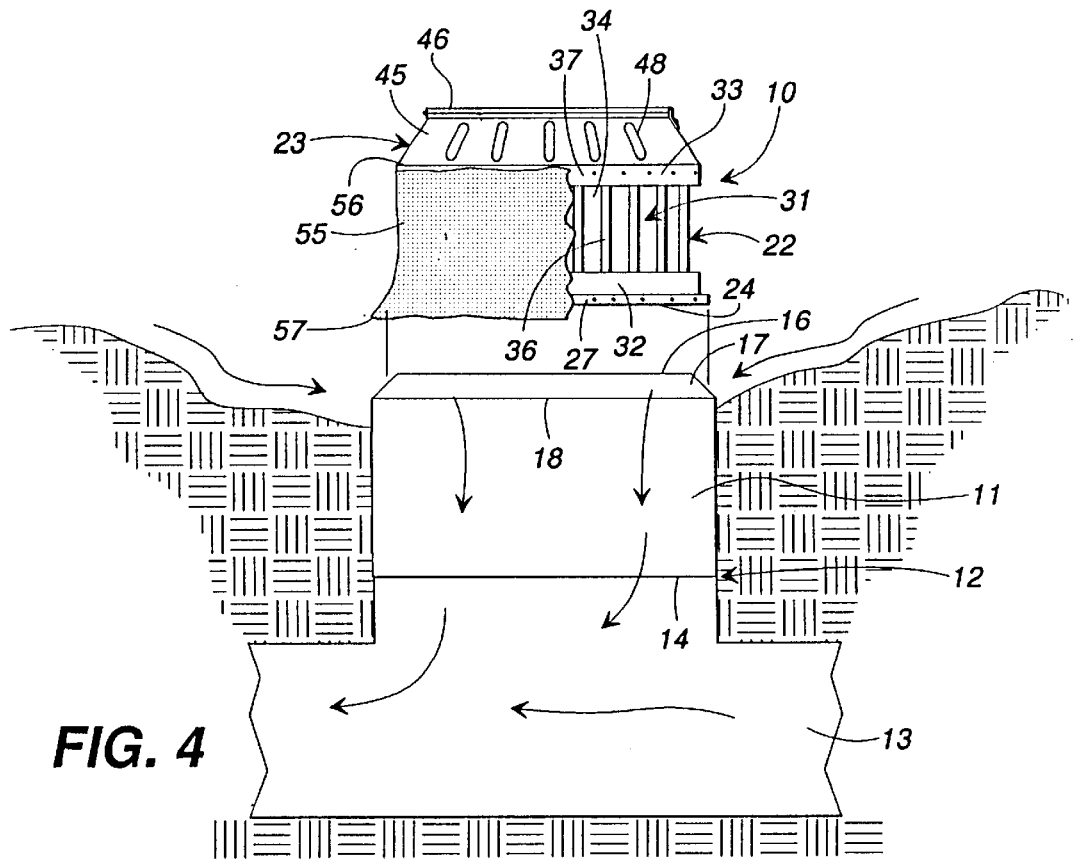
FIG. 4 is a side elevational view illustrating the mounting of the silt guard of the present invention over the open upper end of a drop inlet for a collection basin of a storm water drainage system.
Figure 5:
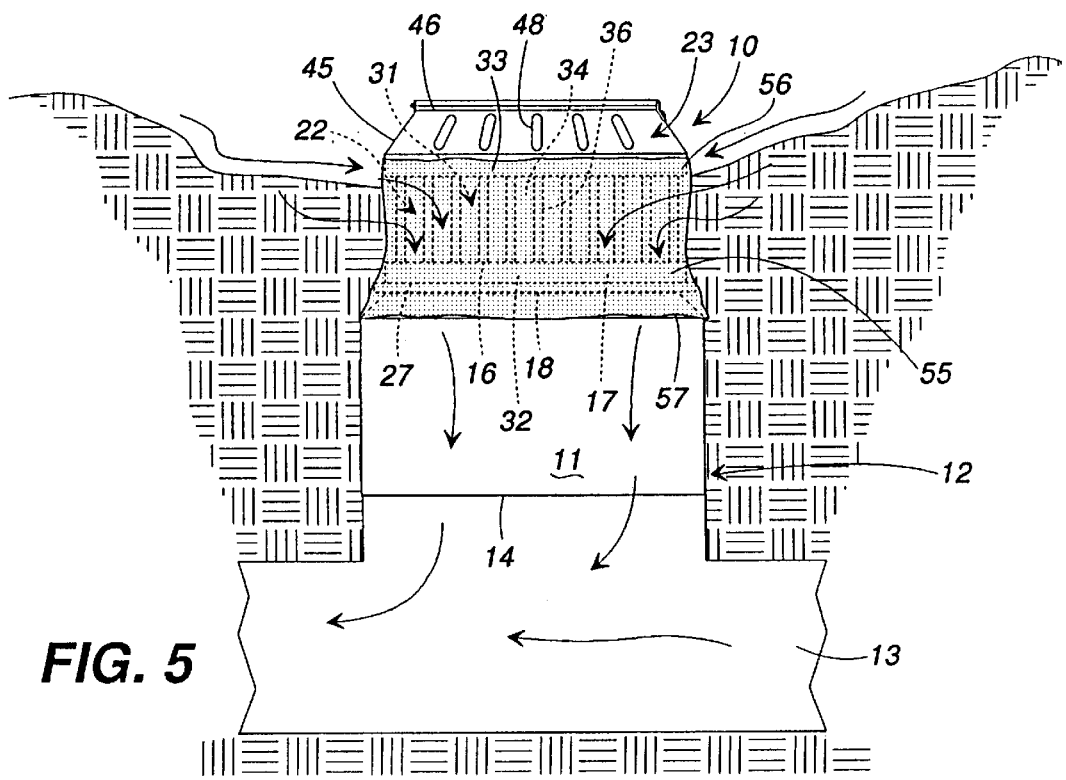
FIG. 5 is a side elevational view of the silt guard of the present invention mounted on a drop inlet and illustrating the flow of water therethrough, and the stability of the present invention to withstand dirt and debris piling up thereagainst.

Referring now to the drawings in which like reference numerals indicate like parts throughout the several views, FIGS. 3–5 illustrate the temporary silt guard 10 of the present invention mounted over a drop inlet 11 of a storm water drainage system 12. The silt guard 10 generally is designed for temporarily covering and protecting an open drop inlet or a drainage system during the grading and construction of the road system for, as well as during additional site grading of, new residential or commercial construction development sites, and as the roads and curbs thereof are graded and poured, in order to prevent silt and debris from collecting within the underground pipes 13 (FIGS. 4 and 5) of the sewer system. Typically, the storm water drainage system will include underground concrete or metal drainage pipes 13, and/or collection basins, with drop inlets 11 mounted thereto.

The drop inlets 11 of the storm water drainage system 12 typically are hollow, substantially cylindrical pipes made from concrete and are mounted vertically with a lower end 14 connected to the drainage pipes 13 and collection basins of the drainage system, with an upper end 16 generally left approximately at or above ground level. The upper end 16 of the drop inlet generally includes an inwardly tapering upper portion 17 that defines an upper opening through which runoff water is permitted to drain into the storm water drainage system, and an upper rim 18 encircling the tapered upper portion 17. After the throats and curbs of the street are poured, the open upper ends of the drop inlets typically form the manholes or curb drains for the street.

To temporarily enclose and prevent inadvertent or unauthorized entry into the open drop inlets during construction, while still enabling storm runoff water to drain into the drainage system, the temporary silt guard 10 of the prevent invention is mounted over the open upper end of the inlet as illustrated in FIGS. 3–5. The silt guard 10 generally is cylindrical in fashion similar to the drop inlet 11 on which it is mounted, and is approximately two to three feet in height. The silt guard thus extends well above the open upper end 17 of the drop inlet 11 to provide a visual indication or marker of the location of the inlet. As shown in FIGS. 3 and 4, the silt guard is sized and shaped to fit over and seat upon the upper rim 18 of most conventional drop inlets 11, and typically is constructed from a rigid, durable plastic material such as polyvinylchloride (PVC), acyrilonitrile-butadinene-styrene (ABS) or acetyl resin such as "DELRIN", or any other similar rigid, durable high strength material which is relatively lightweight for ease of handling. The silt guard further defines an internal passage 21 (FIG. 3) therethrough in which storm runoff water is permitted to pass and drain into the drop inlet, and thus into the storm water drainage system of the development, and which further enables egress into and out of the drop inlet.

As shown in FIG. 3, the silt guard generally includes a lower or body portion 22 with a top portion 23 mounted thereto or formed as a part of the body portion, and extending upwardly from body portion 22. The body portion 22 of the silt guard 10 generally is approximately 18 to 20 inches in height, with an open lower end 24 (shown in dashed lines in FIG. 3) and an open upper end 26, and is tapered from lower end 24 toward upper end 26 in order to enable additional silt guards to be stacked thereon for ease of storage and transport.

A flat, substantially circular bottom rim 27 is formed about the lower end of the body portion. Bottom rim 27 generally has an outer diameter of approximately 48 to 50 inches, and defines a lower opening or passage 28 (shown in dashed lines) having an internal diameter of approximately 46 to 47 inches. The bottom rim typically overlaps the bottom most portion of the body portion of the silt guard by approximately 1 to 2 inches, and is adapted to fit over and seat upon the upper rim 18 of the drop inlet 11. This ensures that the silt guard will be securely positioned over the open upper end 16 of the drop inlet with the open upper end of the drop inlet extending into the open lower end of the silt guard to prevent the silt guard from sliding or otherwise being easily dislodged from the upper end of the drop inlet.

The body portion 22 further includes a filter box portion 31 (FIG. 4) having a base or lower portion 32 that is mounted to the bottom rim 27, and an upper portion 33 spaced therefrom. A spaced series of elongate slats or ribs 34 are defined within the filter box portion of the body portion 22, between the base 32 and upper portion 33 of the filter box. It is anticipated that slats 34 will be approximately 1 to 2 inches in width, and define openings or passages 36 of approximately 1 to 2 inch widths therebetween for the drainage of water through the filter box 31 and into the internal passage 21 (FIG. 3) of the silt guard, as illustrated in FIG. 5, although the dimensions of slats 34, and of openings/passages 36 may be dimensioned otherwise in accordance with the needs of the users of the silt guard. For example, where silt guard 10 is used in conditions with extremely fine soils, it may be desired to either widen slats 34 or narrow passages 36 to give silt guard 10 greater strength against a mass of wet, fine grained material pressing in against filter box 31. As shown in FIGS. 3 and 5, slats 34 slant inwardly toward the upper portion 33 of the filter box from base 32 so as to provide the filter box with a tapered construction.

As shown in FIG. 4, a radially spaced series of fasteners 37 are provided about the upper portion 33 of the filter box 31. Fasteners 37 generally can include screws threaded into fastener openings or can include hooks. Other types of fastening devices, including for example, but not limited to adhesives, metal bands, etc. also can be provided as fasteners 37.

As illustrated in FIGS. 3–5, the top portion 23 of the silt guard 10 is formed on, and extends upwardly from the upper portion 33 of the body portion 22, and has a reduced diameter compared to the diameter of open upper end 26 of the body portion. The top portion includes a substantially conically shaped skirt or tapering portion 45 that extends from filter box 31 of body portion 10 and tapers toward an upper rim 46 formed on top portion 23. The upper rim 46 thus forms the open upper end 26 of the silt guard 10, and defines an inlet opening 47 (FIG. 3) that is approximately 30 inches in diameter. The inlet opening 47 is sized to permit relatively free access into the drop inlet 11 as needed by a worker, but reduces the risk of inadvertent access into the drop inlet by narrowing the size of the opening into the internal passage 21 of the drop inlet. A radially spaced series of slots 48 are formed in skirt 45. Slots 48 are provided so that a pipe or bar may be inserted therethrough to provide a means by which the silt guard can be lifted upwardly off of the drop inlet after use, i.e., protect completion. In addition, the slots also provide an additional passageway for overflow runoff into the drop inlet, when and as needed.

As shown in FIG. 3, a lid or cover 49 may be used to enclose inlet opening 47 on upper portion 23, and may be hingedly mounted to the upper rim 46 to ensure the lid remains with the silt guard. Lid 49 generally is sized to fit over and enclose the inlet opening 47 to prevent access thereto. A locking mechanism 51, for example a conventional pad-lock, or other similar type of latch, secures the lid in a closed position over the inlet opening to restrict access into the drop inlet through silt guard 10 so as to minimize the risk of inadvertent or unauthorized access into the drop inlet.

As illustrated in FIGS. 3–5, a silt screen material 55 is attached to the silt guard 10, generally encircling and covering the body portion 22 thereof. The silt screen material generally is a conventional silt screen material of the type known to those of skill in the art, but can also include a plastic, nylon, or wire mesh, or other similar filtering material or fabric. Silt screen 55 is sized and shaped to fit about filter box 31, and is thus approximately two feet wide or greater. The upper end 56 of the silt screen material 55 is secured to the upper portion 33 of the filter box portion of the body portion of the silt guard by the fasteners 37, with the silt screen material covering and being supported in position by slats 34 of the filter box portion 31. The lower end 57 of the silt screen material is left overlapping the bottom rim 27 of the silt guard by approximately 2 to 3 inches. Accordingly, once the silt guard is installed over the upper end 16 of a drop inlet 11, the upper end of the drop inlet is likewise overlapped by the lower end 57 of the silt screen material 55.

In use, as illustrated in FIG. 4 and 5, once the underground pipes 13 and/or collection basins have been laid, and the drop inlets 11 have been connected thereto, temporary silt guards 10 of the present invention will be placed one apiece atop the upper end 16 of each drop inlet 11 forming a part of the storm water drainage system. It is anticipated that silt screen material 55 will have been first secured about the filter box portion 31 of the silt guard 10 with fasteners 37 (FIG. 4) prior to the installation of the silt guard atop the open upper end of a drop inlet, although it is possible to first mount the silt guard on the drop inlet and to then install the silt screen material about filter box 31. The silt guard is installed over the open upper end of the drop inlet with bottom rim 27 of the silt guard seated on the upper rim 18 of the drop inlet, and with the upper portion 17 of the drop inlet projecting upwardly within and being received in lower opening of the silt guard. This provides a stable, substantially secure mounting of the silt guard on the open upper end of the drop inlet and minimizes the possibility that the silt guard may be dislodged or blown off of the drop inlet.

Thereafter, as the grading of the sites and roadbeds is completed, and the curbs for the streets are then graded, the dirt and debris which typically is pushed up against the silt guard by the grader will be held out of drop inlet 11 and pipe 13. The silt screen material held against the slats of the filter box filters silt and debris from runoff water and permits the runoff water to pass therethrough and to drain into the drop inlet, preventing the silt and debris from passing into the drop inlet. The slats or ribs of the silt guard provide the strength and rigidity needed to support the silt screen material against the weight of the accumulated dirt and debris pushed thereagainst, which thus prevents the probable collapse of the silt screen material as now occurs in the art. At the same time, however, the added weight of the dirt piled against the silt guard serves to further secure and hold the silt guard against the open upper end of the drop inlet to prevent the silt guard from being dislodged. Thus, the drop inlet is kept substantially free of dirt and debris during the grading of the site, as well as of the project curbs and streets, while rain and runoff water is permitted to pass through the silt screen of the silt guard and into the drop inlet where the runoff can drain through the storm water drainage system.

Once the curbs have been graded, any excess dirt around the silt guard and upper end of the inlet will be dug out as part of the process for forming and pouring the throats and manholes about the upper ends of the drop inlets. With the excess dirt removed about the drop inlets, a pipe (not illustrated) or similar bar generally is inserted through opposing ones of the slots 48 5 defined within skirt 45 of top portion 23. A line (not illustrated) or cable may then be connected to the pipe and connected to a crane or bucket of a backhoe, for example, and used to lift the silt guard off of the open upper end of the drop inlet. The used silt screen material is simply peeled or otherwise stripped off of the silt guard and disposed of if it cannot be cleaned and reused, while the silt guard 10 is hosed or washed down to clean excess dirt and debris therefrom, leaving the silt guard ready for its next use.

Accordingly, it can be seen that the present invention provides a unique, temporary silt guard for enclosing the open upper end of a drop inlet that can withstand a substantial weight and the accompanying force of dirt and debris urged or collected thereagainst to prevent this dirt and debris from collecting within the drop inlet, as well as restricting unauthorized access to the open upper end of the drop inlet while still enabling storm runoff water to be drained from the site without the drainage system or adjacent streams or lots becoming clogged with eroded soil and construction debris. As a result, the necessity of sending personnel down into the sewer system to clean out collected dirt and debris therefrom so as to comply with state and county code regulations is substantially minimized. In addition, the light weight construction and design of the silt guard of the present invention enables several silt guards to be stacked one on top of another for ease of transport and storage.

It will be understood by those skilled in the art that while the present invention has been described in terms of a preferred embodiment thereof, numerous modifications, additions and changes can be made thereto without departing from the spirit and scope of the invention as set forth in the following claims.

I claim:

1. A temporary silt guard for enclosing an open end of a drop inlet, said silt guard comprising:
    a body having a lower end constructed to seat upon the open end of the inlet, a spaced upper end, and a series of openings formed intermediate said upper and lower ends to enable runoff water to pass through said body;
    means for filtering silt placed about and supported by said body for filtering silt and debris from water passing therethrough and into the inlet to enable runoff water to be drained from a site with silt and debris within the water prevented from passing into and collecting within the inlet; and
    a top portion extending upwardly from said body for covering and restricting access to the open end of the drop inlet, said top portion having an upper end an opening, defined therein.

2. The temporary silt of claim 1 and wherein said means for filtering comprises a silt screen material.

3. The temporary silt guard of claim 1 and wherein said body further includes a series of spaced slats defining said openings in said body and supporting said means for filtering.

4. The temporary silt guard of claim 1 and wherein said body tapers from said lower end toward said upper end to enable stacking of additional silt guards thereon.

5. The temporary silt guard of claim 1 and further including a cover mounted to said upper end for covering said opening.

6. The temporary silt guard of claim 5 and further including a means for locking said cover over said opening.

7. A silt guard for use with an upstanding drop inlet, the drop inlet having an open upper end with a tapered upper portion surrounded by an upper rim, said silt guard comprising:
    an elongate body portion formed about a longitudinal axis, said body portion having a first end and a spaced second end;
    a spaced series of openings defined in said body portion intermediate said first end and said second end to enable water to pass through said body;
    a silt screen material placed about the exterior periphery of said body portion are passed over each of the openings of said spaced series of openings defined in said body portion for filtering silt from water passing through said body portion.

8. The silt guard of claim 7, further comprising a bottom rim formed at the first end of said body portion for being received on the open upper end of the drop inlet.

9. The silt guard of claim 8, wherein said bottom rim comprises a flange for being seated on the upper rim of the drop inlet.

10. The silt guard of claim 7, further comprising an elongate top portion formed at the second end of said body portion, said top portion having a radially spaced series of openings defined therein.

11. The silt guard of claim 10, said top portion defining an opening therein, said top portion including a lid sized and shaped to be received on said opening for enclosing the second end of said body portion thereby.

12. The silt guard of claim 11, further comprising a locking device constructed and arranged to lock said lid on said opening.

13. The silt guard of claim 10, said top portion extending from the second end of said body portion along said axis and being tapered inwardly toward said axis.

14. The silt guard of claim 7, said silt screen being fastened to said body portion at the second end thereof by a radially spaced series of fasteners.

15. The silt guard of claim 7, wherein said body portion includes a radially spaced series of elongate slats extending from the first end of said body portion to the second end thereof about said axis, said slats defining said spaced series of openings in said body portion therebetween.

16. A silt guard for use with an upstanding drop inlet, the drop inlet having an open upper end with an upper rim, said silt guard comprising:

an elongate body portion formed about a longitudinal axis, said having a first end and a spaced second end;

a bottom rim at the first end of said body portion for being received on the upper rim of the drop inlet;

an elongate top portion formed at the second end of said body portion, said top portion extending from the second end of said body portion along said axis and being tapered inwardly toward axis;

a filter box portion formed within said body portion intermediate said first end and said second end thereof, said filter box including a radially spaced series of openings defined in said body portion to enable runoff water to drain through said body portion; and a silt screen material fastened to the exterior periphery of said body portion about said filter box, said silt fence being passed over each of said spaced series of openings for filtering silt and debris from runoff water draining through said body portion to prevent such silt from passing into and collecting within the drop inlet.

17. The silt guard of claim 16, wherein said silt screen material is fastened to said body portion at the second end thereof and is draped over said bottom rim for extending about and over at least a portion of the open upper end of the drop inlet.

* * * * *

UNITED STATES PATENT AND TRADEMARK OFFICE
CERTIFICATE OF CORRECTION

PATENT NO.  : 5,843,306
DATED       : December 1, 1998
INVENTOR(S) : Singleton

It is certified that error appears in the above-identified patent and that said Letters Patent is hereby corrected as shown below:

<u>Column 8,</u>
Line 36, replace "are" with -- and --.

Signed and Sealed this

Fourth Day of June, 2002

Attest:

JAMES E. ROGAN
Attesting Officer    Director of the United States Patent and Trademark Office